June 19, 1945.  T. W. VICKERS  2,378,668
ELECTRICAL MACHINE
Filed May 24, 1943  3 Sheets-Sheet 1
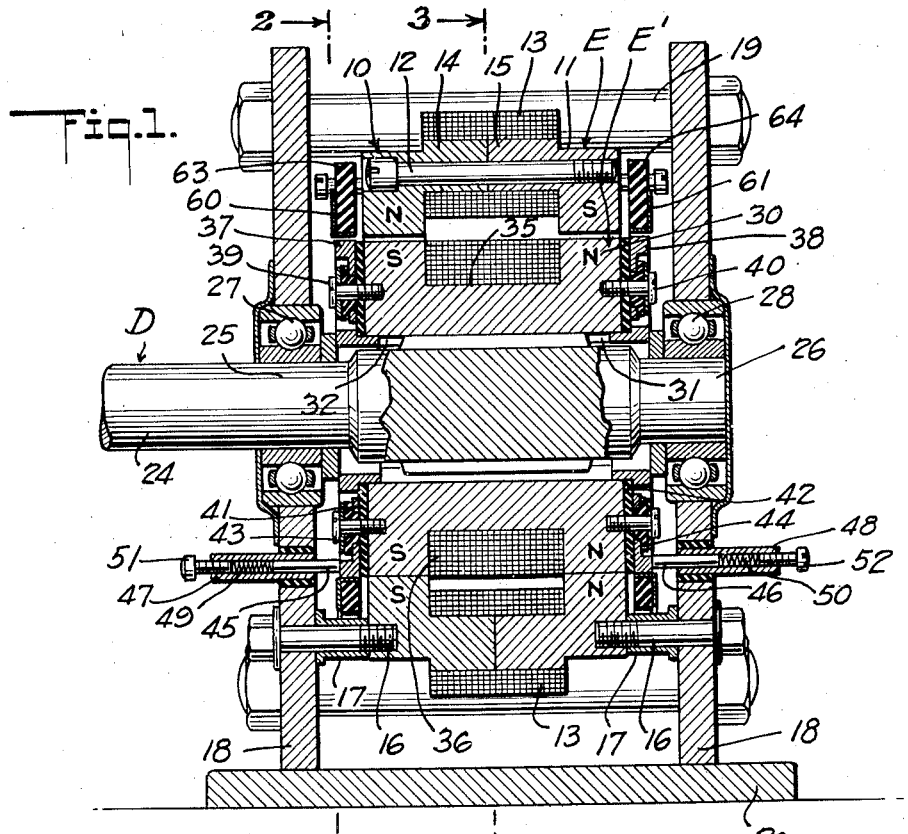
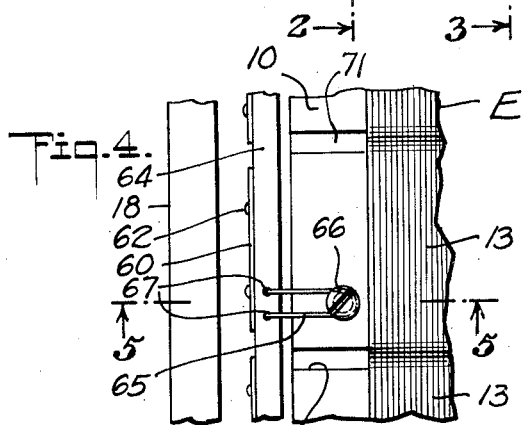
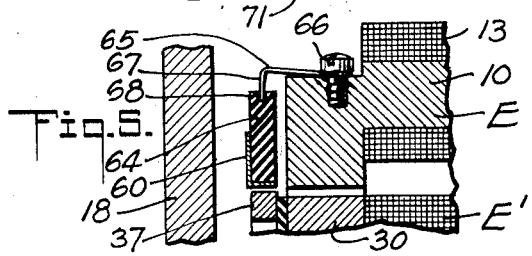
INVENTOR.
THEODORE W. VICKERS
BY
Frederick Diehl
ATTORNEY

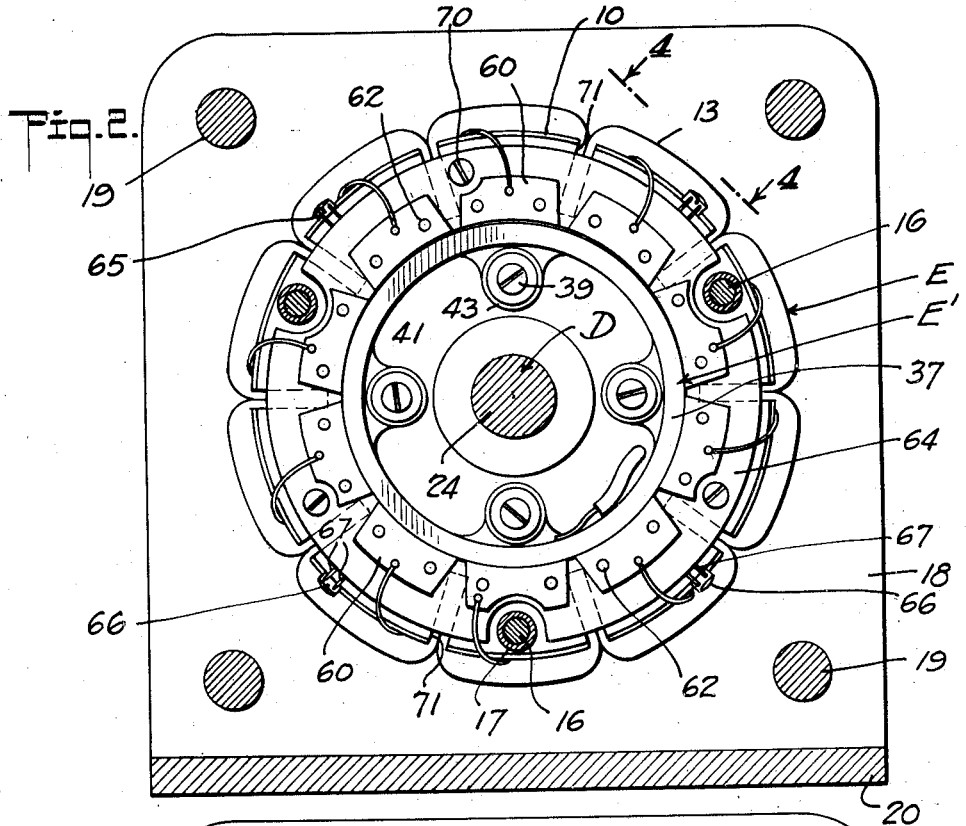
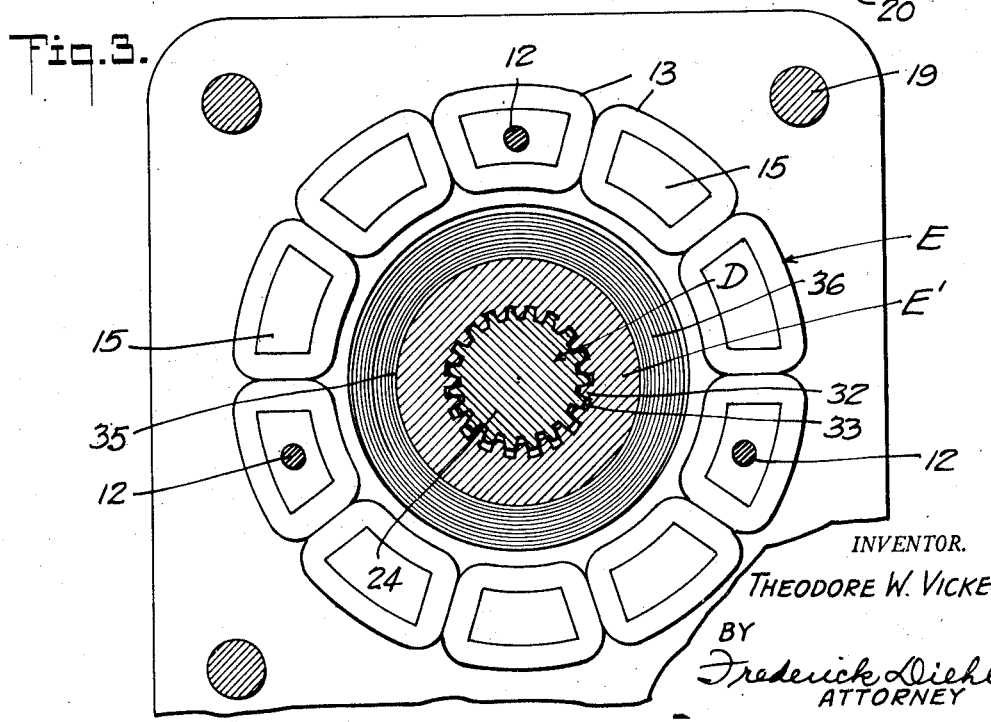

June 19, 1945.   T. W. VICKERS   2,378,668
ELECTRICAL MACHINE
Filed May 24, 1943   3 Sheets-Sheet 3

INVENTOR.
THEODORE W. VICKERS
BY
Frederick Diehl
ATTORNEY

Patented June 19, 1945

2,378,668

UNITED STATES PATENT OFFICE 2,378,668

ELECTRICAL MACHINE

Theodore W. Vickers, Los Angeles, Calif.

Application May 24, 1943, Serial No. 488,161

13 Claims. (Cl. 172—36)

This invention relates generally to electrical machinery and more particularly to mechanisms such as electric motors, generators and equivalent electrical devices.

An object of the invention is to provide an electrical machine which is structurally characterized to convert electromagnetic force into mechanical force or torque by utilizing electromagnetically generated air gap pull to produce a tractive electromagnet exerting a continuous torque particularly adapted, although not necessarily, for use under conditions requiring high torque and relatively slow rotational speed.

Another object of the invention is to provide an electrical machine of the above described character embodying relatively rotatable magnetic fields operatively associated in such manner as to transform the compression of a magnetic field into mechanical force by moving the point of application of the force in a hypocycloidal path, all to effect a continuous force displacement rotationally, capable of performing useful work in many different classes of machinery.

A further object of the invention is to provide an electromagnetic device which is capable of utilizing direct or alternating current; is comparatively simple in construction; exceptionally high in efficiency comparable with the amount of current consumed; and which in direct current construction, embodies novel commutating means insuring a self cleaning and positive electrical contact for maximum efficiency and starting under any and all conditions.

A still further object of the invention is to provide means for utilizing one or more air gaps created between two elements of a machine, which elements are mounted to move in a relative curvilinear path generating a cycloid, and are co-actable in response to a force acting continuously across the air gap, to translate the acting force into the aforestated relative movement of the elements, all while maintaining the gap and causing it to progress in a manner to continue such relative movement between the elements.

With these and other objects in view, the invention resides in the combinations, arrangements and functional relationships of elements as set forth in the following specification and particularly pointed out in the appended claims.

In the accompanying drawings,

Figure 1 is a longitudinal axial sectional view of one form of machine embodying this invention;

Figures 2 and 3 are transverse sectional views taken respectively, on the lines 2—2 and 3—3 of Figure 1;

Figure 4 is an enlarged fragmentary sectional view taken on the line 4—4 of Figure 1;

Figure 5 is a sectional view taken on the line 5—5 of Figure 4;

Figure 6:
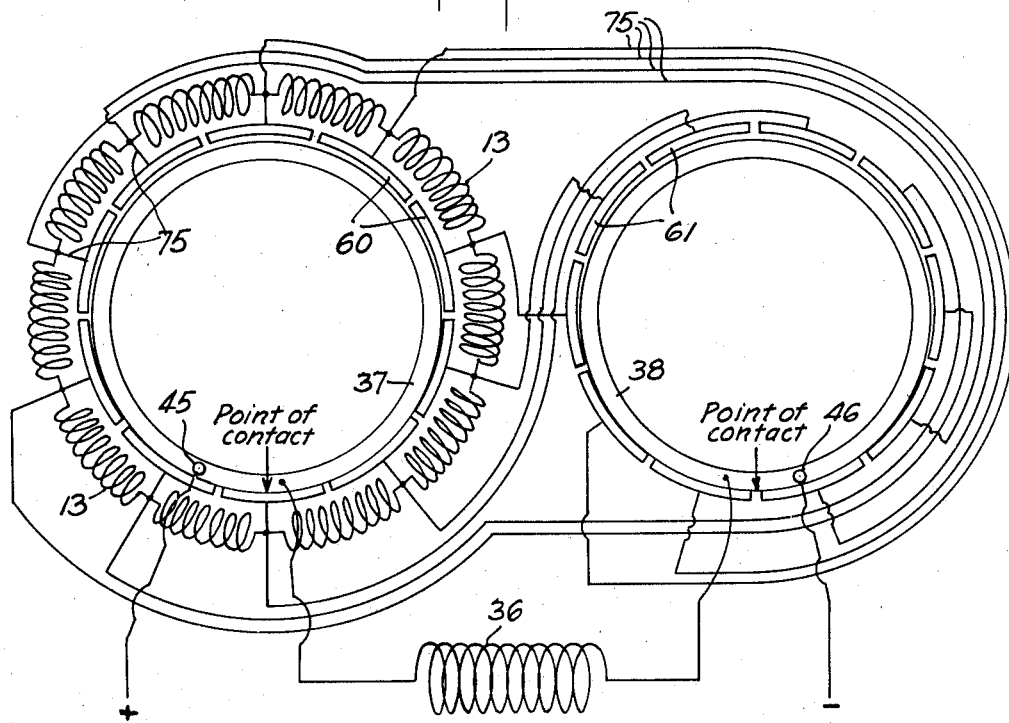
Figure 6 is a diagrammatic view of electrical circuits embodied in the invention.

Referring specifically to the drawings, the invention is illustrated for operation by direct current, but it will be understood that the principle of the invention also renders it adaptable for operation by alternating current.

The illustrated species of the invention is composed of relatively rotatable electromagnetic elements E and E' disposed in eccentric relationship with either one rotatable and the other one stationary, and with the rotatable element operatively connected to a driven member D.

In the present instance the element E constitutes a stationary field of the electrical machine and comprises a two-part annular body of iron whose annular parts 10 and 11 are secured together by bolts 12 to confine field coils 13 on the mating coil-forming portions 14 and 15 of the parts 10 and 11 as shown in Figure 1. The element E is rigidly secured by stud bolts 16 and spacer sleeves 17 between side plates 18 rigidly connected by tie bolts 19, and rising from a base plate 20 adapted to be anchored to a suitable support (not shown).

The driven member D is in the form of a shaft 24 having journals 25 and 26 mounted in antifriction bearings 27 and 28 supported in openings in the side plates 18, to mount the shaft 24 for rotation about an axis, with respect to which the axis of the element E is co-axial.

The electromagnetic element E' constitutes the rotor or armature of the electrical machine and comprises a cylindrical body 30 of iron having a central bore 31 therethrough freely receiving the shaft 24. The outside diameter of the element E' is sufficiently less than the inside diameter of the element E for rolling contact therewith in eccentric relation thereto so as to utilize the air gap pull between the elements, in developing a high torque upon the element E in a manner to be later fully described.

The element E' is operatively connected to the shaft 24 by internal gear teeth 32 meshing with spur gear teeth 33 on the shaft, it being noted that there is sufficient clearance radially between the teeth 32 and 33 to permit the aforesaid rotation of the element E' eccentrically within the element E while the teeth remain in constant mesh. Furthermore, it will be understood that this geared operative connection represents but one of several different means by which rotation of the element E' can be transmitted to the shaft 24.

The element E' is coextensive axially with the element E and is reduced in diameter between its ends to provide an annular recess 35 receiving a winding 36 whose ends are electrically connected to contact rings 37 and 38 fixed to the ends of the element E' by cap screws 39 and 40. The rings 37 and 38 are insulated from the body of the element E' by rings 41 and 42 of insulating material, and the screws 39 and 40 are insulated from the rings 37 and 38 by bushings 43 and 44 of insulating material.

Brushes 45 and 46 are mounted in the side plates 18 in holders 47 and 48, and are urged by springs 49 and 50 into wiping engagement with the outer side faces of the contact rings 37 and 38 so as to energize the winding 36 when the binding posts 51 and 52 of the brush holders are connected in circuit with a suitable source of direct current supply.

In the present instance the field coils 13 are ten in number and are electrically connected to circular sets of contact segments 60 and 61, one set of ten segments for each contact ring 37 or 38 as shown in Figure 6. The contact segments 60 and 61, contact rings 37 and 38 and brushes 45 and 46 constitute a commutating mechanism for the field coils 13 and winding 36 to continuously maintain the proper relation of the fields as will be later fully described.

The sets of contact segments 60 and 61 are secured by fastening members 62 to supporting rings 63 and 64 of insulating material which are yieldingly supported in co-axial relationship to the element E by U-shaped wire springs 65 secured at their connecting bights to the annuli parts 10 and 11 by screws 66. The free ends of the legs of each spring 65 are right angularly bent radially inward of the element E to provide pins 67 seating in sockets 68 in the supporting rings 63 and 64 (Figure 5).

In the present instance four of the springs 65 are provided for each of the rings 63 and 64, and are spaced circumferentially so as to co-act in resiliently suspending the rings 63 and 64 for a limited movement in all directions perpendicular to the axis of the shaft 24. Headed supporting studs 70 are threaded into the annuli parts 10 and 11 and pass freely through the respective supporting rings 63 and 64 to positively connect the latter to the annuli parts against rotational stresses imposed on the supporting rings.

It will be noted that the outside diameter of each of the contact rings 37 and 38 is slightly larger than the outside diameter of the body 30 of the element E', and that the contact rings fit freely within the respective set of contact segments 60 and 61. Due to the rotation of the element E' eccentrically of the element E when in rolling contact with the internal surface of the latter, the peripheral surfaces of the rings will always bear at one point against the resiliently suspended contact segments with sufficient pressure to insure proper electrical contact. It will be understood that the springs 65 yieldingly resist the action of the contact rings 37 and 38 in forcing the supporting rings 63 and 64 off center as the element E' rotates. Furthermore, because of the slightly larger outside diameter of the contact rings 37 and 38 relative to the outside diameter of the element E', and the slightly smaller internal diameter of the contact segments relative to the inside diameter of the body 30, there will be a small slippage circumferentially between the surfaces of the contact rings and contact segments during rotation of the element E', so that such surfaces will actually have a slight wiping engagement, thus insuring a clean electrical contact at all times.

Figure 7:
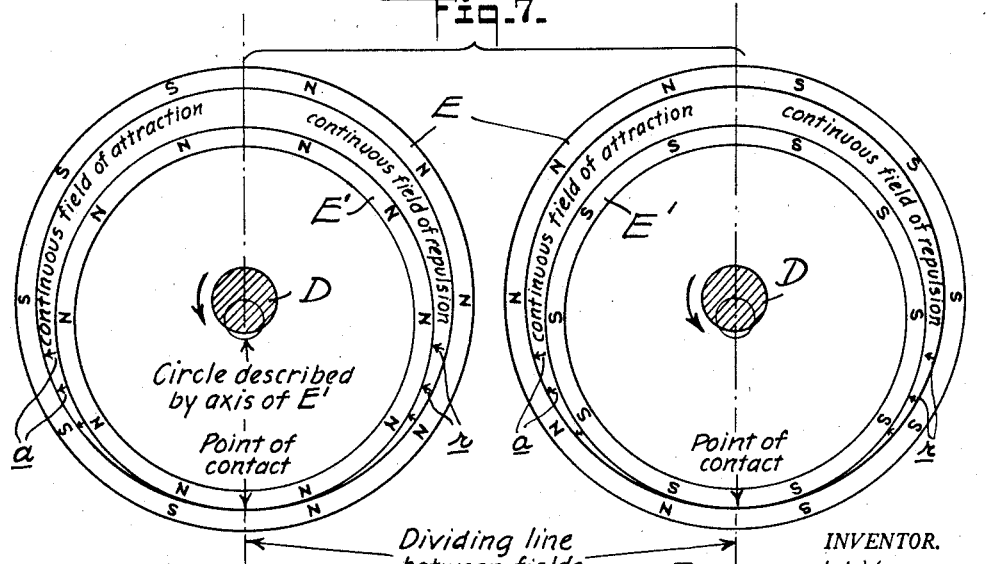
Figure 7 is a diagrammatic view illustrating the polarities and magnetic fields produced in the device.

In operation, it will be noted by reference to Figure 6 that the ends of the field coils 13 are connected to the contact segments 60 and 61 by conductors 75 in a somewhat similar manner to that in which the armature coils in a direct current machine are connected to its commutator segments, it being necessary in order to maintain the proper relation between the magnetic field of the element E' and the field coils 13, that one side always be attracting and the opposite side always be repelling as indicated in Figure 7.

It will also be noted from Figure 6 that the circumferential relationship of the two sets of contact segments 60 and 61 to each other is such that they are relatively displaced one half the angular distance between them, so that only one coil 13 is shorted at any time, with five coils in series on the repulsion side, and four coils in series on the attracting side. This arrangement is preferred, as on the attracting side the increasing magnetic flux should produce a counter E. M. F., whereas on the repulsion side the decreasing magnetic flux should produce a helping E. M. F.

By means of the conductors 75, the contact segments 60 are connected to those contact segments 61 which are substantially diametrically opposite to the contact segments 60 as shown in Figure 6. By reference to Figure 7, it will be noted that the magnetic field of the element E is divided into two parts, caused by the arrangement of polarities of the coils 13 as shown in this figure. Furthermore, it will also be noted from this figure, that the element E' has a north polarity at one end and a south polarity at its other end for co-action with the element E in maintaining the continuous fields of attraction and repulsion in the necessary operative relation to produce the desired relative rotational movement between the elements.

With direct current supplied to the machine through the terminals 51 and 52, the fields of attraction and repulsion which are created between the elements E and E' will produce a torque upon the element E' causing the latter to roll within the element E in the direction of the arrow in Figure 7. By means of the operative connection provided by the teeth 32 and 33, the relatively slow rotational movement of the element E' resulting from its rolling motion hypocycloidally or eccentrically around the element E, will be transmitted to the driven member D to correspondingly rotate the latter in the direction of the arrow.

It will be understood that no torque is developed upon the element E' until same has moved an infinitesimal amount radially towards the element E in the field of attraction as indicated by the arrow $a$ in Figure 7, and radially away from the element E in the field of repulsion as indicated by the arrow $r$.

As the dividing of the magnetic field of the element E into its two parts having north and south polarities respectively, progresses rotationally in step with the rotational movement of the element E', the fields of attraction and repulsion are correspondingly advanced rotationally so as to continuously utilize the air gap pull to develop torque upon the element E'.

As shown in Figures 2 and 4, the parts 10 and 11 of the element E are provided with radially extending slots 71 between the coils 13 so as to increase the magnetic force across the air gaps by interposing reluctance in portions of the magnetic circuit such as to create greater reluctance circumferentially of the element E than across the air gaps, thus forcing the maximum proportion of magnetic flux across the air gaps.

From the foregoing description it will be manifest that this invention in its broadest aspect involves the use of one or more air gaps created between elements relatively movable in a curvilinear path generating some form of cycloid, with a force continuously acting across said gap and translated into the aforestated relative movement between the elements, while the gap is being maintained and caused to progress in a manner to continue such relative movement between the elements. Therefore, the claims are to be broadly construed in accordance with this disclosure.

I claim:

1. An electrical machine of the class described comprising: two electromagnetic elements having axes; means mounting one of said elements within the other with their axes laterally offset in parallelism to dispose the elements in hypocycloidal relationship and in rolling contact for relative rotation, with the space between the elements constituting an air gap; and means co-acting with said elements to electrically energize same so as to produce a high torque pull across said air gap upon the rotatable element and effect rotation of the latter.

2. An electrical machine of the class described comprising: two electromagnetic elements having axes; means mounting one of said elements within the other with their axes laterally offset in parallelism to dispose the elements in hypocycloidal relationship and in rolling contact for relative rotation, with the space between the elements constituting an air gap; means co-acting with said elements to electrically energize same so as to produce a high torque pull across said air gap upon the rotatable element and effect rotation of the latter; a driven member mounted for rotation about a fixed axis; and means operatively connecting the rotatable element to the driven member to rotate the latter.

3. An electrical machine of the class described comprising: an electromagnetic element having an internal annular surface; a second electromagnetic element having a peripheral surface; means mounting the second said element freely within the first said element for relative rotation of the elements with said surfaces thereof in rolling contact and co-acting to define an electromagnetic air gap; and means for supplying current to said elements to energize same and produce a pull across said air gap imparting high torque rotational movement to the rotary element.

4. An electrical machine of the class described comprising: a field element having a circular series of electromagnets and provided with an internal annular surface; an armature element having a winding; means mounting the second said element in the first said element in hypocycloidal relation to said internal surface of the latter, for relative rotation of the elements; and means for supplying current to said magnets and winding to energize them and produce an air gap pull between said elements imparting high torque rotational movement to the rotary element.

5. An electrical machine of the class described comprising: an annular body having a circular series of electromagnets around the body; a cylindrical body having an armature winding; one of said bodies being stationary and the other rotatable hypocycloidally therein in rolling contact therewith and providing an electromagnetic air gap between the confronting surfaces of the bodies; means for energizing said winding; and means coacting with the last means to energize said electromagnets in such relationship as to produce an electromagnetic force across said air gap, operable to impart high torque rotation to the rotatable one of said bodies.

6. An electrical machine of the class described comprising: an annular body having a circular series of electromagnets around the body; a cylindrical body having an armature winding; one of said bodies being stationary and the other rotatable hypocycloidally therein in rolling contact therewith and providing an electromagnetic air gap between the confronting surfaces of the bodies; means for energizing said winding; means co-acting with the last means to energize said electromagnets in such relationship as to produce an electromagnetic force across said air gap, operable to impart high torque rotation to the rotatable one of said bodies; a driven shaft; means mounting said shaft for rotation about a fixed axis co-axially with respect to the stationary body; and means operatively connecting the rotatable body to said shaft.

7. An electrical machine of the class described comprising: an annular body having a circular series of electromagnets around the body; a cylindrical body having an armature winding; one of said bodies being stationary and the other rotatable hypocycloidally therein in rolling contact therewith and providing an electromagnetic air gap between the confronting surfaces of the bodies; two circular sets of contact segments, two segments for each of said electromagnets; means mounting said sets of contact segments on said annular body concentrically thereof; means electrically connecting said electromagnets to the contact segments of one set and to the contact segments of the other set in circumferentially displaced relationship; contact rings, one for each set of contact segments, fixed to the cylindrical body concentrically thereof and in electrical contact with the contact segments of the respective sets; means electrically connecting said winding in series with the contact rings; and means for connecting the contact rings in circuit with a source of current supply to energize the winding and electromagnets and create a force across said air gap, constantly operable to impart high torque rotation to the rotatable one of said bodies.

8. An electrical machine of the class described comprising: an annular body having a circular series of electromagnets around the body; a cylindrical body having an armature winding; one of said bodies being stationary and the other rotatable hypocycloidally therein in rolling contact therewith and providing an electromagnetic air gap between the confronting surfaces of the bodies; two circular sets of contact segments, two segments for each of said electromagnets; means mounting said sets of contact segments on said annular body concentrically thereof; means electrically connecting said electromagnets to the contact segments of one set and to the contact segments of the other set in circumferentially displaced relationship; contact rings, one for each set of contact segments, fixed to the cylindrical body concentrically thereof and in electrical contact with the contact segments of the respective sets; means electrically connecting said winding in series with the contact rings; and means for connecting the contact rings in circuit with a source of current supply to energize the winding and electromagnets and create a force across said air gap, continuously operable to impart high torque rotation to the rotatable one of said bodies; the outside diameter of the contact rings exceeding that of the cylindrical body, and the diameter of the circle defined by the sets of contact segments being less than the internal diameter of the annular body so that during rolling movement between the bodies, the contact rings will have wiping engagement with the contact segments so as to maintain a clean electrical contact therebetween.

9. An electrical machine of the class described comprising: an annular body having a circular series of electromagnets around the body; a cylindrical body having an armature winding; one of said bodies being stationary and the other rotatable hypocycloidally therein in rolling contact therewith and providing an electromagnetic air gap between the confronting surfaces of the bodies; two circular sets of contact segments, two segments for each of said electromagnets; means mounting said sets of contact segments on said annular body concentrically thereof; means electrically connecting said electromagnets to the contact segments of one set and to the contact segments of the other set in circumferentially displaced relationship; contact rings, one for each set of contact segments, fixed to the cylindrical body concentrically thereof and in electrical contact with the contact segments of the respective sets; means electrically connecting said winding in series with the contact rings; and means for connecting the contact rings in circuit with a source of current supply to energize the winding and electromagnets and create a force across said air gap, continuously operable to impart high torque rotation to the rotatable one of said bodies; said mounting means for the sets of contact segments including resilient supports yieldingly opposing the action of the contact rings in forcing the sets of contact segments eccentrically of the annular body so as to insure a pressure engagement of the contact rings and the contact segments.

10. An electrical machine of the class described comprising: a field element having a circular series of electromagnets and provided with an internal annular surface; an armature element having a winding; means mounting the armature element in the field element in hypocycloidal relation to said internal surface of the field element, for relative rotation of the elements; commutating means including contact segments electrically connected to said electromagnets, and contact rings electrically connected to said winding; means mounting the contact rings on the armature element in concentric relation thereto; means resiliently mounting the contact segments on the field element in concentric relation thereto so as to yield radially in response to pressure imposed on the contact segments by the contact rings during relative rotation between the field and armature elements, whereby to insure a positive electrical contact between the contact rings and contact segments.

11. An electrical machine of the class described comprising: a field element having a circular series of electromagnets and provided with an annular surface; an armature element having a winding; means mounting the armature element in the field element in eccentric relation to said internal surface of the field element, for relative rotation of the elements; contact segments electrically connected to said electromagnets; contact rings electrically connected to said winding; means mounting the contact segments on the field element in concentric relation thereto; means mounting the contact rings on the armature element in concentric relation thereto and in engagement with the contact segments; the diameter of the contact rings and armature element being in such relationship to each other and to said internal annular surface of the field element and to the circle defined by the contact segments, that during relative rolling movement between the field and armature elements, the contact rings will have wiping engagement with the contact segments so as to maintain a clean electrical contact therebetween.

12. An electrical machine of the class described comprising: two electromagnetic elements; means mounting said elements for relative movement to define spaced air gaps between the elements which are respectively closing and opening progressively in response to relative movement of the elements; means for supplying current to the elements to magnetically energize same; and means co-acting with the last means to create a magnetic field of attraction across one air gap and a magnetic field of repulsion across the other gap so as to continuously cause closing and opening of said gaps as aforestated, whereby to produce mechanical forces across said gaps effecting relative movement of the elements.

13. An electrical machine of the class described comprising: two electromagnetic elements; means mounting said elements for relative curvilinear movement, with confronting surfaces of the elements defining two air gaps which respectively decrease and increase in width progressively in response to said movement between the elements; means for supplying current to the elements to magnetically energize same; and means for creating a magnetic field of attraction across one air gap and a magnetic field of repulsion across the other air gap so as to continuously cause one air gap to decrease and the other to increase as aforestated, whereby to produce forces across said gaps effecting said relative movement between the elements.

THEODORE W. VICKERS.